United States Patent
Scheffer et al.

(10) Patent No.: US 11,640,468 B2
(45) Date of Patent: May 2, 2023

(54) METHOD FOR OPERATING AN INDUSTRIAL PC DEVICE AND INDUSTRIAL PC DEVICE

(71) Applicant: OMRON Corporation, Kyoto (JP)

(72) Inventors: Fred Scheffer, Hoofddorp (NL); Thorstin Crijns, Hoofddorp (NL)

(73) Assignee: OMRON Corporation, Kyoto (JP)

( * ) Notice: Subject to any disclaimer, the term of this patent is extended or adjusted under 35 U.S.C. 154(b) by 86 days.

(21) Appl. No.: 17/261,177

(22) PCT Filed: Jul. 31, 2019

(86) PCT No.: PCT/IB2019/020027
§ 371 (c)(1),
(2) Date: Jan. 19, 2021

(87) PCT Pub. No.: WO2020/035742
PCT Pub. Date: Feb. 20, 2020

(65) Prior Publication Data
US 2021/0271761 A1    Sep. 2, 2021

(30) Foreign Application Priority Data
Aug. 17, 2018  (EP) ...................................... 18189584

(51) Int. Cl.
*G06F 21/57*    (2013.01)
*G06F 9/4401*   (2018.01)
(Continued)

(52) U.S. Cl.
CPC .......... *G06F 21/575* (2013.01); *G06F 9/4406* (2013.01); *G06F 9/44578* (2013.01); *G06F 21/54* (2013.01); *G06F 21/64* (2013.01)

(58) Field of Classification Search
CPC .. G06F 21/575; G06F 9/4406; G06F 9/44578; G06F 21/54; G06F 21/64;
(Continued)

(56) References Cited

U.S. PATENT DOCUMENTS

2002/0046345 A1* 4/2002 Takeuchi ............... G06F 21/121
713/190
2006/0221961 A1* 10/2006 Basso ..................... H04L 49/90
370/390

(Continued)

FOREIGN PATENT DOCUMENTS

EP    3267649       1/2018
JP    H10301772     11/1998
(Continued)

OTHER PUBLICATIONS

Pujari el al., "Enabling Omron's IPC for Industry 4.0, M2M and IIoT", Aug. 24, 2016, Eindhoven University of Technology, Master's Thesis Report, pp. 1-66 (Year: 2016).*

(Continued)

*Primary Examiner* — Harunur Rashid
(74) *Attorney, Agent, or Firm* — JCIPRNET

(57) ABSTRACT

A method for operating an industrial PC (IPC) device, wherein the IPC device includes a general-purpose operating system (GPOS) section implemented to execute program code under the GPOS, and a real time operating system (RTOS) section implemented to execute program code adapted to real-time data processing under the RTOS, includes providing a wrapped application program based on an application program including binary code designed to be executed under the RTOS and a security policy; validating the wrapped application program according to the security policy by an RTOS process for obtaining a validated application program; transferring the binary code of the validated application program and a security element from the RTOS (Continued)

process to a GPOS process; establishing a secure communications channel between the GPOS process and the RTOS section using the security element; and executing the binary code of the validated application program by the GPOS process.

19 Claims, 4 Drawing Sheets

(51) Int. Cl.
*G06F 9/445* (2018.01)
*G06F 21/54* (2013.01)
*G06F 21/64* (2013.01)

(58) Field of Classification Search
CPC .......... G06F 21/57; G06F 9/455; G06F 21/51; G06F 21/53; G06F 21/606
See application file for complete search history.

(56) References Cited

U.S. PATENT DOCUMENTS

| | | | |
|---|---|---|---|
| 2012/0016977 A1* | 1/2012 | Robertson | H04L 67/141 709/227 |
| 2013/0055335 A1* | 2/2013 | Chien | G06F 21/572 726/1 |
| 2015/0264047 A1* | 9/2015 | Roy | H04W 12/06 726/4 |
| 2015/0271160 A1* | 9/2015 | Ponsini | H04W 12/04 713/171 |
| 2016/0232366 A1* | 8/2016 | Van Gorp | G06F 30/20 |
| 2018/0239896 A1* | 8/2018 | Kato | G06F 12/14 |

FOREIGN PATENT DOCUMENTS

| | | |
|---|---|---|
| JP | 2000138917 | 5/2000 |
| JP | 2012003617 | 1/2012 |
| JP | 2012048617 | 3/2012 |
| JP | 2017162483 | 9/2017 |
| WO | 2011074168 | 6/2011 |

OTHER PUBLICATIONS

"International Search Report (Form PCT/ISA/210) of PCT/IB2019/020027", dated Oct. 18, 2019, pp. 1-3.

"Written Opinion of the International Searching Authority (Form PCT/ISA/237) of PCT/IB2019/020027", dated Oct. 18, 2019, pp. 1-5.

"Office Action of Japan Counterpart Application" with English translation thereof, dated Dec. 14, 2021, p. 1-p. 6.

* cited by examiner

METHOD FOR OPERATING AN INDUSTRIAL PC DEVICE AND INDUSTRIAL PC DEVICE

CROSS-REFERENCE TO RELATED APPLICATION

This application is a 371 application of the International PCT application serial no. PCT/IB2019/020027, filed on Jul. 31, 2019, which claims the priority benefit of European Patent Application No. 18189584.8, filed on Aug. 17, 2018. The entirety of each of the above-mentioned patent applications is hereby incorporated by reference herein and made a part of this specification.

BACKGROUND

The present disclosure relates to methods for operating a computer and a computer, in particular intended for industrial purposes in connection with automation networks or systems.

Computer systems for industrial purposes often have to fulfill special functions such as process control and/or data acquisition. Sometimes personal computer (PC) devices are used as industrial PCs (IPC). An IPC may employ a particular form factor such as a net-top or a server rack. It is generally desirable to use off-the-shelf operating systems (OS) in IPCs based on state-of the-art PC technology. In the past, IPCs having virtualized sections of general purpose operating systems (GPOS) and real-time operating systems (RTOS) have been used. The independently running GPOS and RTOS sections then share the same hardware, and the resources are managed by a hypervisor or virtual machine monitor (VMM).

In order to exchange data between the various virtualized OS sections, shared memory concepts were proposed. For example, EP 3 267 649 A1 discloses methods and industrial computing apparatuses for performing secure communication between RTOS and GPOS sections. It is further sometimes desirable to use applications designed to run under a specific operating system requiring particular interfaces or data transfers.

In the context of automation systems or automation networks, applications to control field devices require minimal interrupt latencies, minimal buffering delays and minimal thread switching latencies of the operating system. Hence, automation system-specific software is mostly implemented to be executed under real-time operating system conditions. Further, a RTOS in particular processes application data as comes in without buffering delays. On the other hand, IPCs can efficiently be manufactured and implemented to run general purpose operating systems, such as Apple OS, Microsoft Windows or UNIX derivatives.

Hence, there is a desire to securely operate an IPC device involving data transfer between various operating system sections. It is in particular desirable to allow access to real-time operating system specific ports to access automation networks. RTOS ports may receive and transmit control and/or sensor data from/to field devices.

SUMMARY

It is thus an object of the present disclosure to provide improved methods for operating industrial PCs running various operating system sections and respective IPC devices.

Accordingly, a method for operating an industrial PC device, the IPC device including a general-purpose operating system (GPOS) section implemented to execute program code under a GPOS, and real-time operating system (RTOS) section implemented to execute program code adapted to real-time data processing under the RTOS is provided.

The method comprises the steps of:
providing a wrapped application program based on an application program including binary code designed to be executed under the RTOS and a security policy;
validating the wrapped application program according to the security policy by an RTOS process for obtaining a validated application program;
transferring the binary code of the validated application program and the security element from the RTOS process to a GPOS process;
establishing a secure communications channel between the GPOS process and the RTOS section using the security element; and
executing the binary code of the validated application program by the GPOS process.

According to another aspect, an industrial PC (IPC) device comprises:
a GPOS section implemented to execute program code under the GPOS;
an RTOS section implemented to execute program code adapted to real-time data processing under the RTOS; and
a hypervisor section implemented to manage an execution of the GPOS and the RTOS as a guest machine on the IPC device as a host machine;
wherein the IPC device is implemented to:
validate a wrapped application program according to a security policy assigned to the application program by an RTOS process for obtaining a validated application program, wherein the wrapped application program is obtained by wrapping an application program including binary code designed to be executed under the RTOS and applying the assigned security policy;
transfer the binary code (BC) of the validated application program and a security element from the RTOS process to a GPOS process;
establish a secure communications channel between the GPOS process and the RTOS section using the security element; and to
execute the binary code (BC) of the validated application program by the GPOS process.

According to an alternative aspect, a method for operating an industrial PC (IPC) device is provided, wherein the IPC device includes:
a general-purpose operating system (GPOS) section implemented to execute program code under a GPOS; and
a real time operating system (RTOS) section implemented to execute program code adapted to real-time data processing under the RTOS.

And the method comprises the steps of:
providing an application program including binary code designed to be executed under the RTOS;
wrapping the application program thereby applying a security policy to the application program for generating a wrapped application program;
validating the wrapped application program according to the security policy through an RTOS process for obtaining a validated application program;

transferring the binary code of the validated application program and a security element from the RTOS process to a GPOS process;

establishing a secure communications channel between the GPOS process and the RTOS section using the security element; and executing the binary code of the validated application program through the GPOS process.

A further aspect of this disclosure relates to a method for executing a program code adapted to real-time data processing under a real-time operating system (RTOS).

The method comprises the steps of receiving a wrapped application program based on an application program including binary code designed to be executed under the RTOS and a security policy;

validating the wrapped application program according to the security policy by an RTOS process for obtaining a validated application program;

transferring the binary code of the validated application program and the security element from the RTOS process to a GPOS process;

establishing a secure communications channel between the GPOS process and the RTOS section using the security element; and executing the binary code of the validated application program by the GPOS process.

In the disclosed methods for operating an IPC device and/or the disclosed IPC devices, GPOS refers to an operating system that has not necessarily a real-time data processing capability. In comparison to the RTOS section, the GPOS section in an IPC device may have larger buffering delays as application process data comes in or is generated. The RTOS or RTOS section is in particular implemented to provide low interrupt latency and low thread switching latency in comparison to the GPOS section, for example POSIX or other available real-time OS can be used as an RTOS.

A wrapped application program is the result of an application-wrapping process or app-wrapping process. In an app-wrapping process, a management layer can be applied to an application without applying changes to the underlying application. For example, an application can be wrapped by setting specific policy elements to an application. A policy element can be a security policy requiring authentication of the wrapped app or a digital signature may be added to the application. In particular, wrapping an application may allow an administrator to take the application and associate extra security and management features with the application and then redeploy the wrapped application as a single containerized program to be distributed. A wrapped application can be distributed by a specific distributer defining the policy elements.

In particular, the disclosed methods for operating an industrial PC executing an application can include the steps of:

providing the application program including binary code designed to be executed under the RTOS; and wrapping the application program thereby applying a security policy to the application program for generating the wrapped application program.

A security policy and the executable code (binary code) of the application are part of the wrapped application. The security policy may comprise a definition of what is considered secure for the industrial PC, GPOS, RTOS environment or the application. For example, the security policy may require authenticating the wrapped application using a specific security level. The security level can be determined by a certificate or a cryptographic signature or other mechanism to authenticate the wrapped application program. Security policy may refer to a trustworthy identifier of the issuer of the software or distributor of the application. In embodiments the security policy requires that the wrapped application contains an encrypted version of the binary code and/or a certificate for identifying the origin of the application, as e.g. the distributor or vendor.

The underlying application program having binary code implemented to be executed under the RTOS may be a legacy application that is designed to run on prior versions of the RTOS or on hardware devices that are outdated or obsolete. The actual binary code of the application program can still work, however may raise compatibility issues with current operating systems or required security levels. In particular, the RTOS section can be a secured area granting access to machine-control software managing the generation and/or exchange of control data and sensor data to and from field devices. Generally, a GPOS section should not be granted such access. Hence, in conventional systems, legacy application programs that are designed to be executed under the RTOS section cannot be executed in a GPOS context.

In the disclosed embodiments, the binary code can be validated according to the security policy, for instance involving an authentication process under the RTOS in an RTOS process. If the application program is validated, the executable binary code of the validated application program is sent to the GPOS process together with a security element.

If the application program cannot be validated or the validation fails access to a secure communications channel can be blocked, and/or the execution of the binary code is prevented.

The security element allows to set up a secure communications channel between the GPOS process and the RTOS section. For example, a security element can comprise a security dongle, a nonce, a certificate, a cryptographic key and the like. It is an advantage of the disclosed methods and devices that the binary code initially implemented to be executed under the RTOS can be used as a validated application program in terms of a GPOS process. In particular, application data generated or received from the validated application program running under the GPOS process can be transferred through the secure communications channel. A secure communications channel is in particular a communication tunnel using encrypted data.

Thus, in embodiments of the methods, application data to and/or from the GPOS process executing the binary code of the validated application program is transferred through the secure communications channel.

In embodiments, the method further comprises: emulating an insecure communications protocol required by the application program designed to be executed under the RTOS within the secure communications channel.

For example, a legacy application for the RTOS can require an application data transfer to or from automation field devices based on a specific protocol. For example, a database client implemented as legacy software or a connectivity standard employed by the legacy application is not considered secure in a GPOS environment. In embodiments, the insecure communications protocol is a connectivity standard for communication between automated equipment, such as field devices and/or sensor devices and the host factory network. The legacy application can be a machine control application designed to be running under an RTOS. One can contemplate an SECS/GEM standard.

As a result, the binary code running, for example, under a software service provided by the GPOS can use RTOS-specific communications protocols wherein the application data transfer is tunneled through the secure communications channel.

The term "legacy", e.g. legacy software or legacy application refers to elements that are designed to be used in an RTOS environment and, e.g. for security reasons, their full functionality should not be deployed in an environment other than the intended RTOS environment.

In embodiments, the security policy includes at least of: encrypting the binary code of the application program, adding a cryptographic signature, adding a cryptographic certificate to the binary code, and adding a cryptographic signature or cryptographic certificate to the encrypted binary code.

Encrypting the binary code or signing the binary code or the application program allows to authenticate the wrapped application program within the RTOS section. For example, an RTOS boundary process can be used to authenticate or validate the application program by checking the encryption or the signature attached to the code.

In embodiments, the security policy is applied to the binary code of the wrapped application program and the method further comprises:
de-wrapping the wrapped application program thereby extracting the binary code of the application program to which the security policy was applied;
validating the extracted binary code by the RTOS process according to the security policy for obtaining a validated binary code; and
executing the validated binary code by the GPOS process.

For example, a legacy binary code designed for an RTOS can then still run under a software service implemented in the GPOS section. Then, the RTOS process, for example a boundary process, checks the signature of the binary code or checks if the certificate attached to the binary code match with the specific certificates or arise from trustworthy issuers.

The de-wrapping process is preferably be executed by a RTOS process, consequently evaluating, for example, the certificate by the RTOS boundary process for validating the binary code enclosed in the wrapped application program. Hence, validating can occur without transferring the de-wrapped binary code extracted from the wrapped application.

In embodiments of the method, validating the wrapped application code and/or the extracted binary code includes authenticating based on a security certificate and/or decrypting using a cryptographic key. If the security policy requires an authentication by a security certificate, the RTOS process checks the validity of the security certificate. In an alternative approach, the binary code can be encrypted, wherein the RTOS process uses a cryptographic key to decrypt the binary code.

In embodiments of the method, the security element is uniquely assigned to the validated application program or to the validated binary code.

The security element is in particular a security token, a security certificate and/or a cryptographic signature. The security element is an element and allows for a secure communication in terms of the secure communications channel. For example, a secure communications channel between the RTOS section and the GPOS section can be based on a cryptographic tunnel. A cryptographic tunneling protocol allows for the secure movement of data from one entity to another. In the present disclosure, the secure communications channel is preferably implemented according to a tunneling protocol. Tunneling protocols of embodiments are based on an SSH algorithm and in particular based on a TLS protocol.

In embodiments of the method, the following steps are executed:
attaching a security certificate as security element to the binary code of the validated application program or the validated binary code prior to transferring to the GPOS process; and
granting access to the RTOS section through the secure communications channel as a function of the attached security certificate by the GPOS process executing the binary code of the validated application or the validated binary code and/or the RTOS process.

In embodiments, the binary code of the application program designed to be executed under the RTOS includes a Java code or a .NET code. For example, legacy applications are sometimes implemented in Java code that is executed by an RTOS software service within the secure environment of an automation network. When using an IPC having a GPOS and an RTOS section as virtualized guest machines, a legacy Java and/or .NET code can be executed using the GPOS section having a Java engine. As a result, the GPOS guest machine can be used to execute legacy control software, e.g. implemented as Java code, wherein application data is securely exchanged through the secure communications channel to and/or from the RTOS section. This is a particular advantage when the RTOS section concludes a machine controller application for controlling the field devices in an automation system. The machine controller application may implement setting, programming, debugging and maintenance of a machine automation controller device. For example, those functions may be transferred to the GPOS section employing the disclosed methods and devices.

In embodiments of the IPC device, the hypervisor section is implemented to provide a software bus, for exchanging requests, binary code and/or security elements between the GPOS section and the RTOS section. Such a software bus service can be used to exchange a wrapped application program, the binary code and to establish secure communications channels. A software bus may perform other functions as well. Generally, the hypervisor section may be implemented to assign hardware resources of the IPC device such as processors or processor cores to the GPOS and RTOS sections. The hypervisor can also be referred to as a virtual machine monitor (VMM).

In embodiments, the IPC device has an RTOS section that includes at least one port for communicatively coupling with field devices in an automation system according to a predetermined communications protocol. The communications protocol can be, for example, EtherCAT or EtherNet/IP. In other embodiments, the Siemens PROFINET standard can be used as a communications protocol to and from a machine controller application in the RTOS section.

According to a further embodiment, the method comprises the steps of:
providing a plurality of wrapped application programs, wherein each of the wrapped application programs is generated based on a respective application program including respective binary code designed to be executed under the RTOS and a respective security policy assigned to the respective application program;
validating each of the plurality of wrapped application programs according to the respectively assigned security policy by a respective RTOS process for obtaining a plurality of validated application programs;

transferring a plurality of binary codes of the plurality of validated application programs from the respective RTOS processes to respective GPOS processes, wherein a respective security element is assigned to each of the binary codes of the validated application programs; and executing the binary codes of the validated application programs by the respective GPOS processes, wherein application data to and/or from the respective GPOS processes executing the respective binary codes of the validated application programs is transferred through the same secure communications channel.

In particular, the IPC may be implemented to execute validated application programs in parallel to each other. For example, each application program is a legacy application program, that is wrapped and thus has a respectively assigned security policy. Each of the wrapped application programs can be validated in dependently from each other using the assigned security policy. The security policy can be, for example, an encryption or a cryptographic certificate to authenticate the respective application program. If the RTOS process, for example an RTOS boundary process, authenticates or validates the application program, the binary code can be returned to the GPOS process for execution.

In embodiments, to each of the validated application programs, a specific token or security element is assigned. If, for example, validation of one out of the plurality of wrapped application programs fails, no binary code is returned to the GPOS and/or no security token or security element is provided by the RTOS so that a not-validated application program cannot be executed by the GPOS.

Alternatively, or additionally, an application program or binary code executed by the GPOS, that is not validated by the RTOS process, is prevented from using the secure communications channel.

In embodiments, only one communications channel is established between the GPOS section and the RTOS section. Thus, validated legacy applications can use the secure communications channel contemporaneously.

In embodiments, different application programs or binary codes are assigned different security elements. The security elements can be, for instance, certificates that assign different rights, in particular in connection with the ports of the RTOS section coupling to an automation network.

The present disclosure allows for the use of legacy applications intended to be used in RTOS devices in GPOS environments. An industrial PC at the same time ensures secure communication, and prevents security breaches because application data is securely transferred between the GPOS and the RTOS upon granting access or validation of the legacy software by the RTOS (boundary) process.

According to a further aspect, this disclosure relates to a computer program product comprising a program code for executing the above-described methods by an IPC when run on at least one computer. A computer program product, such as a computer program means, may be embodied as a memory card, USB stick, CD-ROM, DVD or as a file which may be downloaded from a server in a network. For example, such a file may be provided by transferring the file comprising the computer program product from a wireless communication network.

The embodiments and features described with reference to the apparatus, i.e. the IPC device of this disclosure apply mutatis mutandis to the methods of operating the IPC device and vice versa.

Further possible implementations or alternative solutions of the invention also encompass combinations—that are not explicitly mentioned herein—of features described above or below with regard to the embodiments. The person skilled in the art may also add individual or isolated aspects and features to the most basic form of the invention.

BRIEF DESCRIPTION OF THE DRAWINGS

Further embodiments, features and advantages of the present invention will become apparent from the subsequent description and attached claims, taken in conjunction with the accompanying drawings, in which:

In the Figures, like reference numerals designate like or functionally equivalent elements, unless otherwise indicated.

DESCRIPTION OF THE EMBODIMENTS

Figure 1:
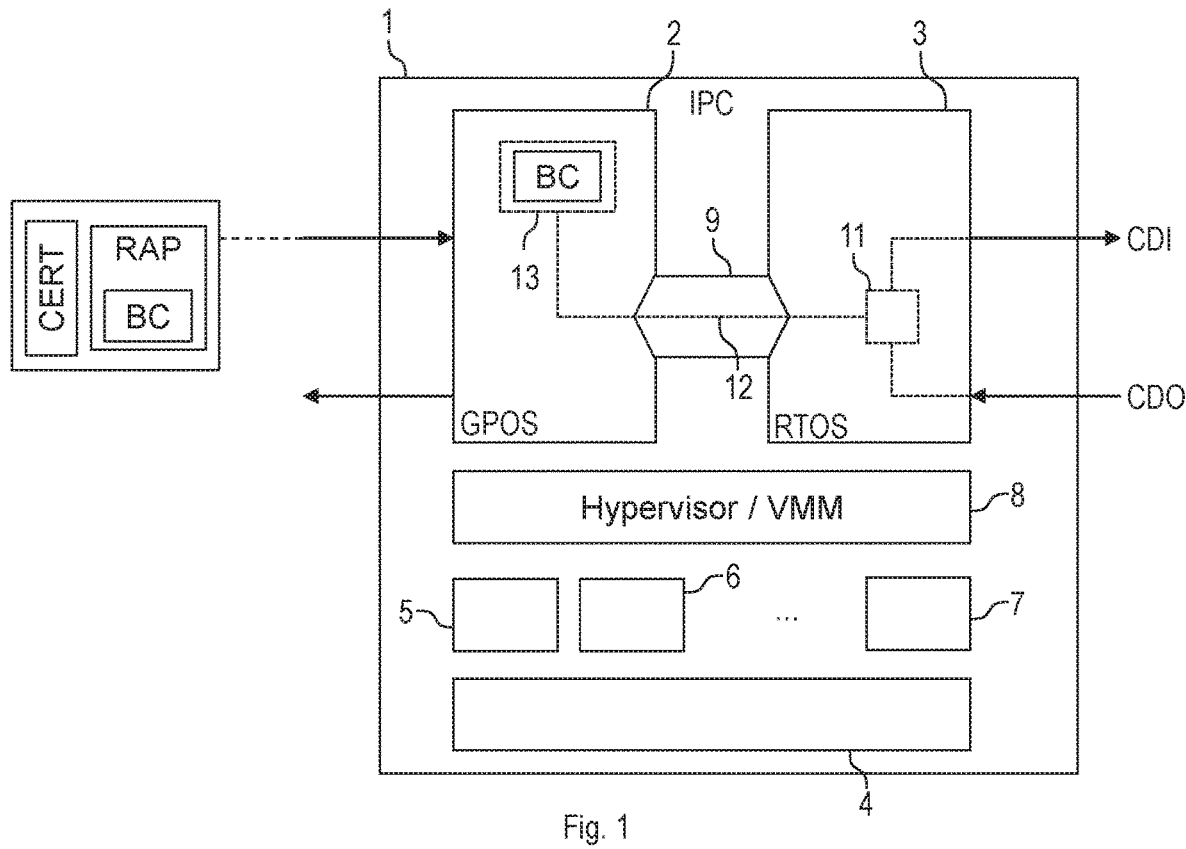
FIG. 1 shows a schematic diagram of a first embodiment for an industrial computer device.

FIG. 1 shows a schematic diagram of a first embodiment for an industrial computer device. The IPC device 1 is intended for an industrial automation system and includes several PC technology aspects working independently together. A general-purpose operating system section 2 and a real-time operating system section 3 run independently from each other as guest machines on the IPC device 1 as a host. A hypervisor 8 that can be implemented as computer software, firmware or hardware creates and runs the virtual machines, i.e. the GPOS section 2 and the RTOS section 3. The hypervisor 8 or virtual machine monitor manages the execution of the guest operating systems GPOS and RTOS. The IPC device 1 provides several hardware resources, such as a processor 4 and processor cores 5, 6, 7. The hypervisor 8 thus provides virtualized hardware resources of the IPC device 1 to the guest operating systems.

A communication means 9 that can be implemented as a software bus managed by the hypervisor 8 allows for data exchange between the operating system sections 2, 3. The general-purpose operating system can be, for example, a Microsoft Windows operating system. One can also contemplate of other operating systems, such as Apple OS or Unix derivatives.

The RTOS section 3 is based on an operating system that has real-time properties. In particular, the RTOS is implemented to process data that comes in or goes out without buffering delays. For example, the RTOS is implemented to receive control data or sensor data CDO from field devices in an industrial automation system on the one hand and generates control data CDI on the other hand. The data CDO and CDI may be transferred via an automation network bus system, such as EtherCAT or Profinet.

The RTOS is in particular compatible with existing legacy systems that can be implemented as hardware or software in field devices or dedicated machine controllers. Often, applications that are designed to run under an RTOS can be tested or modified using a GPOS. In some instances, it is desirable to run such legacy applications designed for an RTOS section in the GPOS section. However, in particular, legacy RTOS applications implementing database clients or machine control applications that use outdated communications protocols can be considered insecure if they run on a GPOS.

In the following, referring to FIG. 1, a method for operating or running an industrial PC device 1, as for example shown in FIG. 1, is presented. The disclosed methods allow to use legacy applications, intended for RTOS environments, in the GPOS section 2. At the same time a secure data transfer between the GPOS, where a software service executes the legacy binary code of the application, and ports implemented in the RTOS section 3 is provided.

In a first step S0, a wrapped application WRAP is provided. A wrapped application results from wrapping an application RAP that is designed to be executed under the RTOS with the security policy. The real-time application RAP is implemented as Java code that can be executed through a software service or Java engine in the RTOS. However, it is desirable to run the same code BC in a GPOS section 2. Thus, as shown in FIG. 1 to the left, a wrapped application WRAP is generated that comprises the binary code BC designed to be executed under the RTOS and a certificate CERT as a security policy. In the disclosed embodiment, the security policy requires that the application RAP is digitally signed and contains executable binary code BC.

In a next step S1, a software service 13 of the GPOS section 2 transmits the wrapped application to an RTOS boundary process, for example through a software bus 9. Next, an RTOS boundary process 11 validates the wrapped application program WRAP based on the certificate CERT. The certificate CERT can represent a signature that is checked as to its authenticity by the RTOS boundary process 11 in step S2. If the RTOS boundary process 11 validates or authenticates the binary code BC, the binary code BC is sent back together with a security element SE in step S3 to the GPOS section 2.

The GPOS section 2 implements a software service 13 such as a Java engine JE that is indicated in FIG. 1. For example, the legacy binary code is written in terms of Java code. Then the binary code BC comprises Java code that may be encrypted and signed to form the wrapped application WRAP. Generally, the Java code can be executed by any Java engine. The executable Java code BC can then be processed by the Java engine 13 in the GPOS. The wrapped application WRAP is provide by a vendor or distributor to the IPC device 1. Hence, only validly encrypted and signed Java code is accepted by the RTOS boundary process in step S2.

In order to allow for an exchange of application data to and from the Java engine 13 running the binary code BC, a secure communications channel 12 between the GPOS process (including the Java engine) 13 and the RTOS section 3 is established in step S4. The secure communications channel is, for example, a TLS tunnel that uses symmetric cryptography for data exchange. The security element SE is, for example, a nonce that can be a random or pseudorandom number to establish the secure connection. Other security elements can be contemplated.

Indicated as step S4, application data AD can be transferred between the GPOS process 13 and the RT section 3. For example, the secure tunnel emulates a legacy protocol that is designed for an application RAP that is implemented to run under a hidden RTOS. For example, the Java code BC may implement a database client that requires access to devices coupled to the RTOS section 3 through dedicated ports coupling to an automation network. As shown in FIG. 1, the authentication service or boundary service 11 in the RTOS section 3 may allow application data (see step S4) to be transferred between the RTOS section 3 and the software service 13 running the binary code BC (Java) in the GPOS section 2. Hence, the proposed and disclosed methods allow the execution of a legacy Java byte code, as an example for a binary code designed to be executed under an RTOS, within the GPOS section 2.

Figure 3:
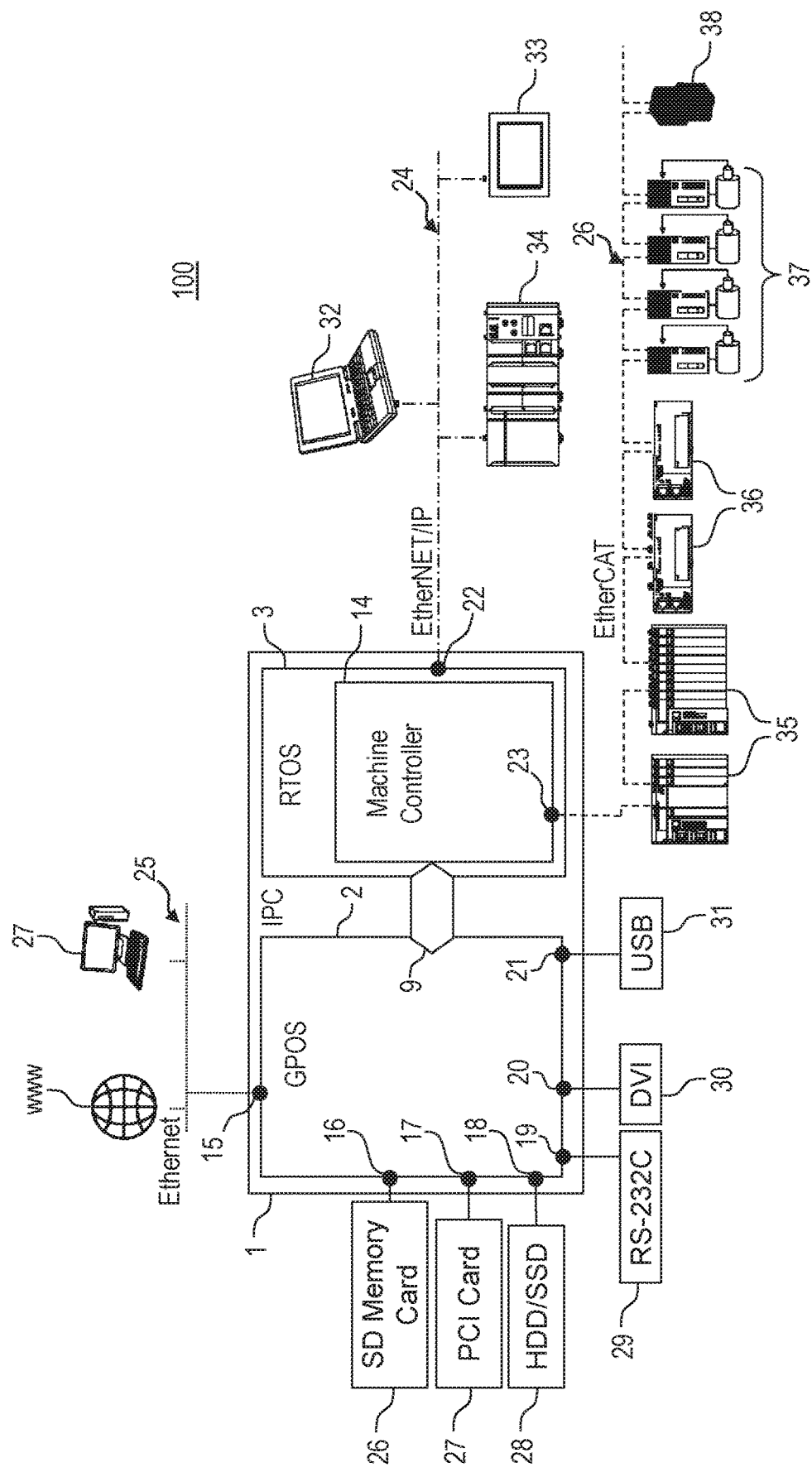
FIG. 3 shows a schematic diagram of an embodiment for an automation system involving an embodiment of an industrial PC device.

The method is in particular useful when the IPC device 1 is integrated in an automation network or in an industrial automation system. FIG. 3 shows an embodiment of an automation system 100 having an IPC device 1. The IPC device 1 is generally implemented as shown in FIG. 1. However, for illustrative purposes, the hypervisor and hardware components of the IPC host are omitted in the figure. The GPOS section 2 provides several communication ports 15-21 for providing interfaces. For example, the GPOS section 2 can be coupled through an Ethernet port 15 to the Internet WWW. For example, terminal devices, such as PCs, can be coupled via an Ethernet 25 to the IPC device 1 using the GPOS section 2. Other examples for communication ports generating interfaces are an SD memory card port 26, a PCI card port 27, a hard disk port 28, a serial port 29, a DVI port 30 or USB port 31. In FIG. 1, SD, PCI, hard disk, serial, DVI and USB devices 26-31 are shown as examples. The GPOS is, for example, a Windows 10 operating system. Also, other Windows standards can be used.

The RTOS section 3 is, for example, an RT operating system and has real-time capabilities for automation purposes. The RT operating system includes and implements a machine controller application 14. The machine controller application 14 is implemented to communicate and control field devices over dedicated industrial networks. For example, the RTOS section 3 has an EtherNET/IP port 22 and allows to couple over an Ethernet network to a terminal device 32 and other industrial PCs 34 and/or user interfaces 33.

The RTOS section 3 further provides a port 23 to communicatively couple with field devices 35, 36, 37, 38 over a predetermined communications protocol. For example, the port 23 is coupled to an EtherCAT bus system 26. One can also contemplate of other communications protocols such as Profinet by Siemens.

The machine controller application 14 is in particular implemented to set, program, debug or maintain automation controller services. For example, the software machine controller 14 can receive data from safety devices 35, e.g. implementing light curtains. At the same time, the machine controller application 14 may control actuator devices 37 or receive sensor data from sensor devices 38. The functions of a machine controller is often implemented by legacy applications that are dedicated to run under the RTOS. In some instances, the legacy applications may be implemented to run on embedded systems rather than on an IPC.

Next, a further embodiment for a method for operating an IPC device, e.g. shown in FIG. 1 or 3, or a method for executing a provided software code adapted to real-time data processing under the RTOS within the GPOS environment is shown. The functions and processes indicated in FIG. 4 are implemented by respective software services provided by the GPOS and RTOS.

Figure 4:
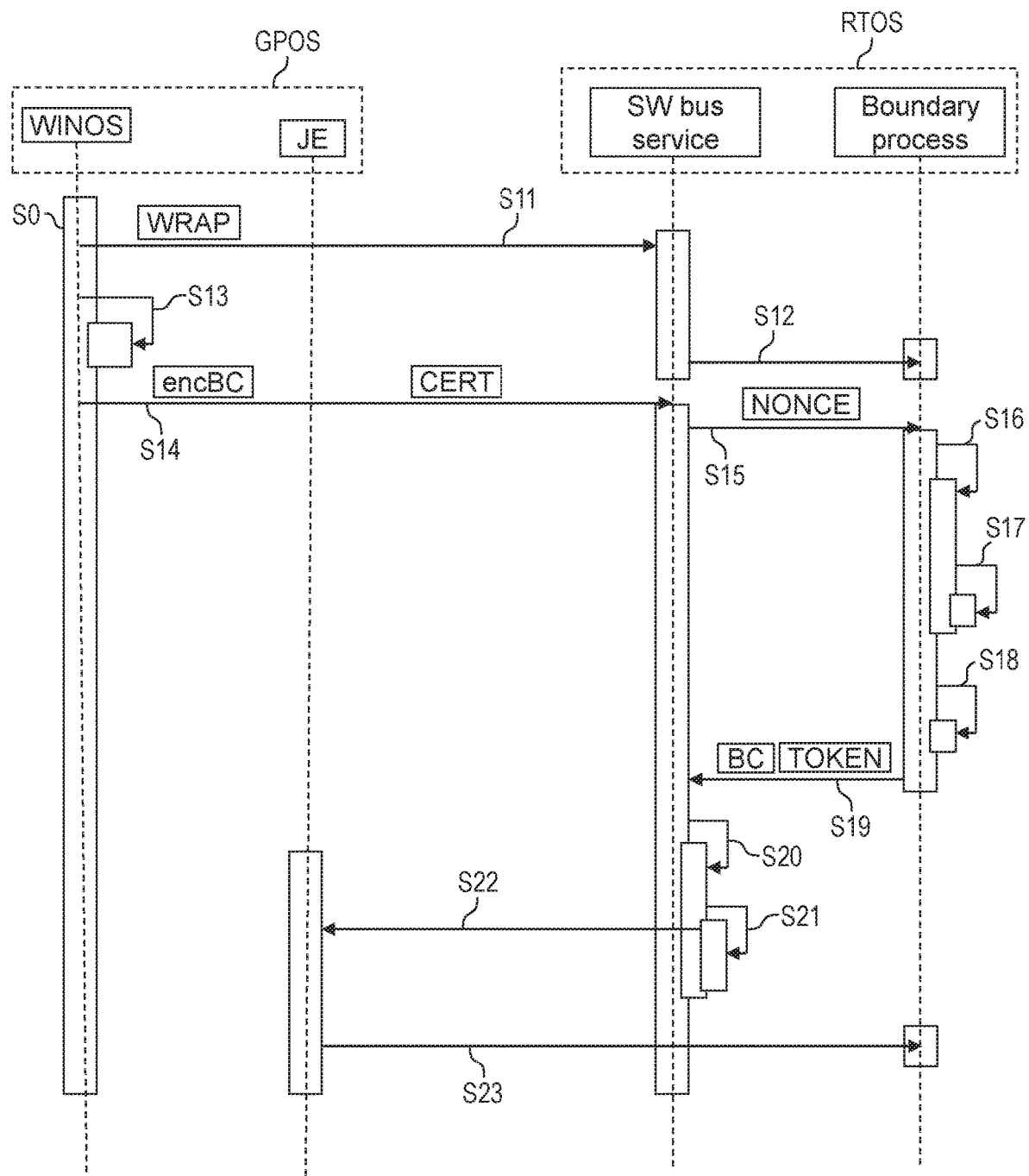
FIG. 4 shows process flow involving method steps of a second embodiment for a method for operating an industrial PC device.

The left section of FIG. 4 shows GPOS processes, while on the right hand-side shows RTOS services or processes.

In the embodiment of FIG. 4, a Windows operating system WINOS is assumed to receive a wrapped Java application WRAP. The Java application is encrypted provided with a certificate for authentication. The GPOS or Windows operating system provides a Java engine JE.

In a first step S0, the wrapped application WRAP is received. The Windows operating system WINOS couples to a software bus service in step S11. This can involve a security certificate enabling an access to the software bus service. Next, the software bus service connects to the RTOS boundary process. The boundary process or the RTOS is implemented as an RT operating system. Connecting to the boundary process in step S12 may involve the execution of a hash function.

Next, in step S13, the encrypted Java code encBC retrieved from the wrapped application WRAP is obtained. In step S14, the encrypted Java application encBC together with a signature or certificate CERT is passed to the software bus service of the RTOS. Hence, the software bus service obtains the encrypted Java code and a Java code signature as an authentication of the Java code's origin, e.g. the software distributor.

In the next steps, a secure communications tunnel is established to allow for application data to be exchanged between the GPOS running the Java code and e.g. the machine controller shown in FIG. 3. The software bus service passes a request to open a secure communications channel, e.g. emulating a legacy communications channel, to the RTOS boundary process in step S15. Step S15 may involve passing the encrypted Java code, the signature or certificate vouching for the origin of the Java code and a nonce to the RTOS boundary process. The RTOS boundary process checks the Java code signature CERT, for example with matching certificates.

If the boundary process authenticates the provenance or origin of the Java code by verifying the signature, the Java code is decrypted in step S17. As a result, executable Java code is available at the boundary process.

Next, in step S18, a secure channel is established. This can involve sending a token and the binary code resulting from the decryption process of the encrypted Java code.

In step S19, the binary code, i.e. the executable Java code, and a security token as a security element is transmitted to the software bus service. The software bus service next initiates the execution of the legacy Java code by the JE in the GPOS section. This is indicated in step S20.

Hence, the software bus service loads and starts the binary code through a Java native interface in step S22. Steps S21 and S22 involve generating a security token in order to establish the secure tunnel, for example in terms of a TLS connection. Hence, the Java code is executed by the Java engine in the GPOS, however, at the same time, can communicate over the secure channel in step S23 and access the ports provided in the RTOS. This means the Java code or the binary code BC may operate and execute a legacy communications protocol that is considered insecure in terms of the GPOS. For example, the TLS tunnel implements an emulated insecure protocol that is compatible with the legacy real-time operating system application.

Hence, referring back to FIG. 3, a software service in the GPOS executes outdated or legacy binary code wherein the binary code may communicate over an insecure protocol that is encapsulated by the secure communications channel 12 (see FIG. 1) and access data that a real-time machine controller can procure. For example, the legacy binary code may comprise a control function for an actuator device. The GPOS generally does not have an access to a communications port coupling to the automation network 26 (see FIG. 3). However, establishing a secure tunnel between the software service 13 (see FIG. 1) in the GPOS section 2 and a boundary process 11 (see FIG. 1) of the RTOS section 3 may allow the execution of a control algorithm in terms of a Java app thereby generating application or control data CDI to control an actuator device 37.

Figure 5:
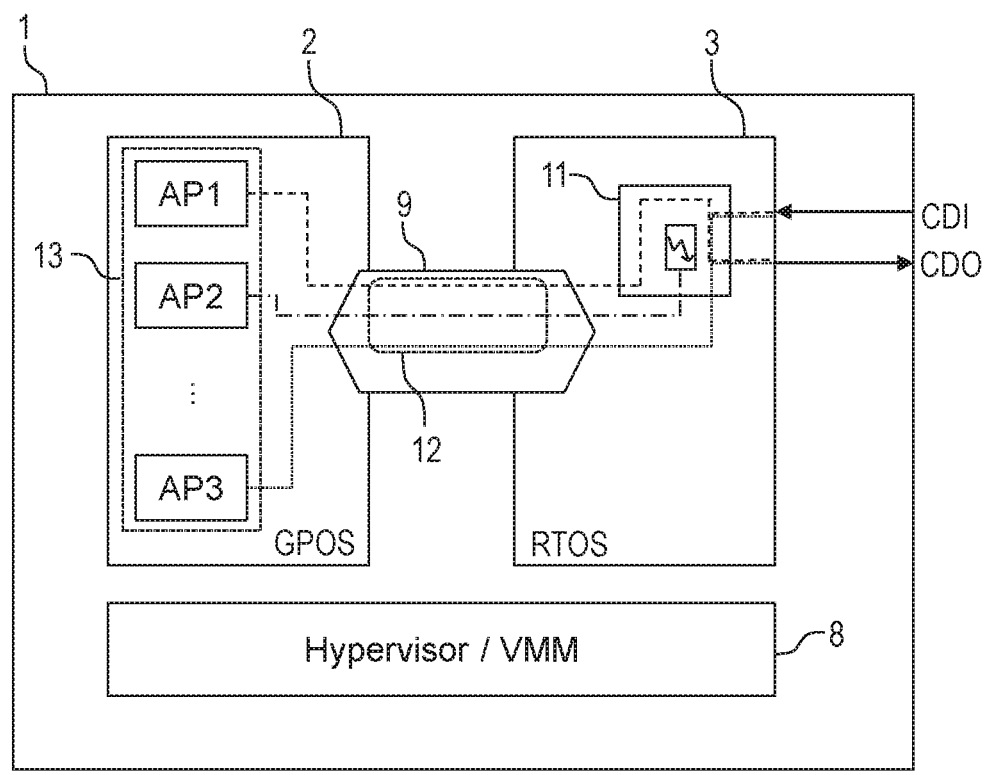
FIG. 5 shows a schematic diagram of a third embodiment for an industrial computer device.

FIG. 5 shows a schematic diagram of a third embodiment for an industrial computer device, e.g. an IPC device 1. Generally, the IPC device 1 is implemented as shown in FIGS. 1 and 3. The IPC device 1 has a GPOS section 2 and an RTOS section 3 wherein the RTOS section 3 may generate and receive control data CDO, and receive CDI, for example from an automation network under a particular communications protocol. A boundary process or authentication process 11 is implemented in the RTOS section 3 allows the secure communication between applications AP1, AP2, AP3 running under a legacy software service 13 in the GPOS section 2. A software bus service 9 can be used to establish a secure communications tunnel 12 between the GPOS section 2 and the RTOS section 3.

Figure 2:
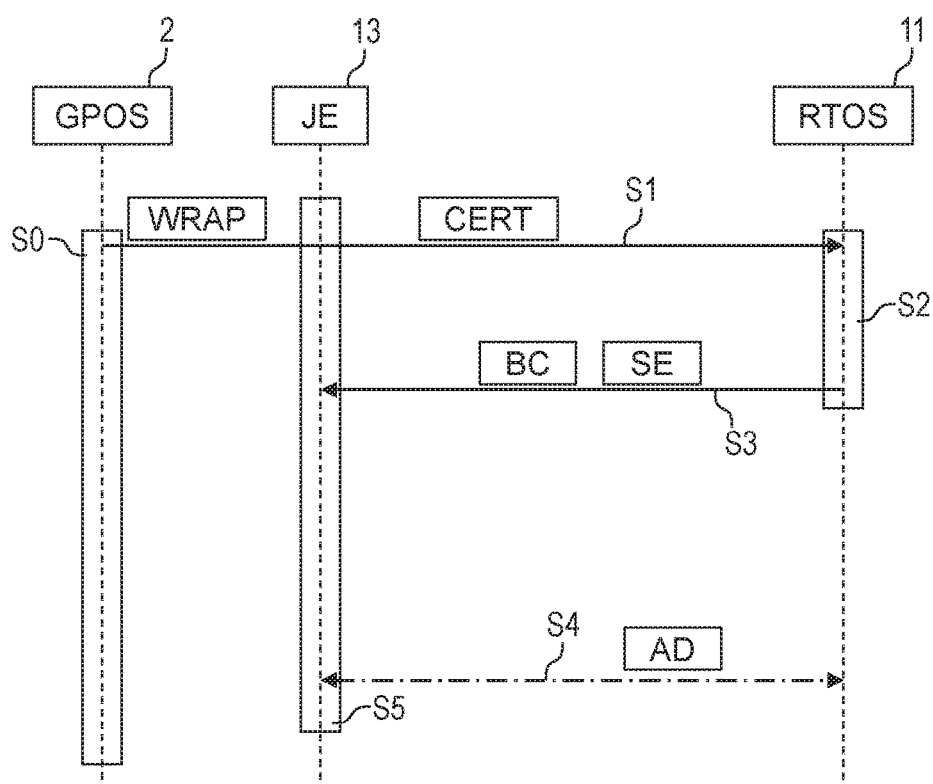
FIG. 2 shows process flow involving method steps of a first embodiment for a method for operating an industrial PC device.

In FIG. 5, a plurality of application programs AP1-AP3 is shown wherein each application program AP1, AP2, AP3 is implemented to be executed under the RTOS. The application programs AP1, AP2, AP3 are provided as wrapped application programs wherein each application program has an assigned security policy, for example a signature or certificate attached. For each of the legacy application programs AP1, AP2, AP3, the process according to FIG. 2 or FIG. 4 can be executed, however only one secure communications channel 12 is established. Secure communication between the respective legacy app is indicated by the dotted, dash-dotted and dashed line running through the secure tunnel 12 wherein the boundary process 11 in the RTOS allows or blocks a secure communication. For example, AP2 is not granted access to the control data CDI and sensor data CDO. For example, the security policies may differ from application to application of the plurality of applications AP1-AP3.

Depending on the certificate enclosed to the application AP1, AP2, AP3 of the plurality of apps in terms of the application wrapping the granted access to resources of the RTOS section may differ. For example, a respective certificate attached to the application allows for different rights. As an example, the access to the resources of the RTOS section 3 is determined as a function of the certificate or security policy attached to the legacy application in the wrapping process. Thus, the boundary process 11 grants access to the automation network port of the RTOS to the applications AP1 and AP3, however denies the access to application AP2.

Although the present invention has been described in accordance with preferred embodiments, it is obvious for the person skilled in the art that modifications are possible in all embodiments. For example, one can contemplate other executable codes than Java as a legacy binary code. For example, the application binaries can be implemented by .NET code. Instead of using certificates, one can use cryptographic signatures or tokens in order to authenticate the wrapped applications.

The invention claimed is:

1. A method for operating an industrial PC (IPC) device for an automation system, the IPC device including:
    a general-purpose operating system (GPOS) section implemented to execute program code under a GPOS; and a real time operating system (RTOS) section implemented to execute program code adapted to real-time data processing under a RTOS, wherein the RTOS section is communicatively coupled with a plurality of field devices in the automation system;

the method comprising:

providing, by the GPOS section, a wrapped application program (WRAP) based on an application program (RAP) including binary code (BC) designed to be executed under the RTOS and a security policy, wherein the security policy is configured to provide that the application (RAP) is digitally signed and contains executable binary code BC;

validating the wrapped application program according to the security policy by an RTOS process in the RTOS section for obtaining a validated application program, wherein the security policy is configured to represent a signature that is checked as to its authenticity by the RTOS process;

transferring the binary code (BC) of the validated application program and a security element (SE) from the RTOS section to a GPOS section;

establishing a secure communications channel between the GPOS section and the RTOS section using the security element (SE); and executing the binary code of the validated application program by a GPOS process in the GPOS section to transfer application data between the GPOS section and the RTOS section, wherein the security policy is applied to the binary code of the wrapped application program, and the method further comprises:

de-wrapping the wrapped application program thereby extracting the binary code of the application program to which the security policy was applied;

validating the extracted binary code by the RTOS process according to the security policy for obtaining a validated binary code; and executing the validated binary code by the GPOS process.

2. The method of claim 1, further comprising:
transferring application data to and/or from the GPOS section executing the binary code of the validated application program through the secure communications channel.

3. The method of claim 1, further comprising:
emulating an insecure communications protocol required by the application program designed to be executed under the RTOS within the secure communications channel.

4. The method of claim 1, further comprising:
providing the application program including the binary code designed to be executed under the RTOS; and
wrapping the application program thereby applying the security policy to the application program for generating the wrapped application program.

5. The method of claim 1, wherein the security policy includes: encrypting the binary code of the application program, adding a cryptographic signature or certificate to the binary code and/or adding a cryptographic signature or certificate to the encrypted binary code.

6. The method of claim 1, wherein validating the wrapped application program and/or the extracted binary code includes:
authenticating based on a security certificate and/or decrypting using a cryptographic key.

7. The method of claim 1, wherein the security element is uniquely assigned to the validated application program or to the validated binary code.

8. The method of claim 1, wherein the security element includes: a security token, a security certificate and/or a cryptographic signature.

9. The method of claim 1, further comprising:
attaching a security certificate to the binary code of the validated application program or the validated binary code prior to transferring to the GPOS process; and
granting access to the RTOS section through the secure communications channel as a function of the attached security certificate by the GPOS process executing the binary code of the validated application program or the validated binary code.

10. The method of claim 1, further comprising:
providing a plurality of wrapped application programs, wherein each of the plurality of wrapped application programs is generated based on a respective application program including respective binary code designed to be executed under the RTOS and a respective security policy assigned to the respective application program; and
validating each of the plurality of wrapped application programs according to the respectively assigned security policy by a respective RTOS process for obtaining a plurality of validated application programs;
transferring a plurality of binary codes of the plurality of validated application programs from the respective RTOS processes to respective GPOS processes, wherein a respective security element is assigned to each of the plurality of binary codes of the plurality of validated application programs; and
executing the binary codes of the validated application programs by the respective GPOS processes; wherein application data to and/or from the respective GPOS processes executing the respective binary codes of the validated application programs is transferred through the same secure communications channel.

11. The method of claim 1, wherein the binary code of the application program designed to be executed under the RTOS includes Java code or .NET code.

12. The method of claim 1, wherein the secure communications channel employs a TLS protocol.

13. An industrial PC (IPC) device for an automation system, comprising:
a GPOS section implemented to execute program code under a GPOS;
a RTOS section implemented to execute program code adapted to real-time data processing under a RTOS, wherein the RTOS section is communicatively coupled with a plurality of field devices in the automation system; and
a hypervisor section implemented to manage an execution of the GPOS and the RTOS as guest machines on the IPC device as host machine;
wherein the IPC device is implemented to:
validate a wrapped application program (WRAP) according to a security policy assigned to an application program by an RTOS process in the RTOS section for obtaining a validated application program, wherein the wrapped application program (WRAP) is obtained by the GPOS section by wrapping an application program (RAP) including binary code (BC) designed to be executed under the RTOS and applying the assigned security policy, wherein the assigned security policy is configured to provide that the application (RAP) is digitally signed and contains executable binary code BC, and the assigned security policy is configured to represent a signature that is checked as to its authenticity by the RTOS process;

transfer the binary code (BC) of the validated application program and a security element from the RTOS section to the GPOS section;

establish a secure communications channel between the GPOS section and the RTOS section using the security element to transfer application data between the GPOS section and the RTOS section; and execute the binary code of the validated application program by a GPOS process in the GPOS section, wherein the security policy is applied to the binary code of the wrapped application program, and the method further comprises:

de-wrapping the wrapped application program thereby extracting the binary code of the application program to which the security policy was applied;

validating the extracted binary code by the RTOS process according to the security policy for obtaining a validated binary code; and executing the validated binary code by the GPOS process.

14. The IPC device of claim 13, implemented to execute a method of claim 1.

15. The IPC device of claim 13, wherein the hypervisor section is implemented to provide a software bus service for exchanging requests, binary code and/or security elements between the GPOS section and the RTOS section.

16. The IPC device of claim 13, wherein the hypervisor section is implemented to assign hardware resources of the IPC device (1) to the GPOS and RTOS sections.

17. The IPC device of claim 13, wherein the RTOS section includes a machine controller application for controlling field devices in an automation system.

18. The IPC device of claim 13, wherein the RTOS section includes at least one port for communicatively coupling with field devices in an automation system according to a predetermined communications protocol.

19. The IPC device of claim 14, wherein the predetermined communications protocol includes an EtherCAT or EtherNet/IP standard.

* * * * *